(12) United States Patent
Rdzanek et al.

(10) Patent No.: US 12,552,293 B2
(45) Date of Patent: Feb. 17, 2026

(54) MOTORIZED DRIVE DEVICE FOR RAISING A VEHICLE SEAT

(71) Applicant: FAURECIA Sièges d'Automobile, Nanterre (FR)

(72) Inventors: Emil Rdzanek, Piaseczno (PL); Nicolas Navatte, Condé sur Noireau (FR); Niles Liang, Wuxi (CN)

(73) Assignee: FAURECIA Sièges d'Automobile, Nanterre (FR)

( * ) Notice: Subject to any disclaimer, the term of this patent is extended or adjusted under 35 U.S.C. 154(b) by 330 days.

(21) Appl. No.: 18/307,460

(22) Filed: Apr. 26, 2023

(65) Prior Publication Data

US 2023/0347793 A1     Nov. 2, 2023

(30) Foreign Application Priority Data

Apr. 28, 2022  (FR) ...................................... 2203990

(51) Int. Cl.
*B60N 2/02* (2006.01)
*B60N 2/225* (2006.01)

(52) U.S. Cl.
CPC ......... *B60N 2/02246* (2023.08); *B60N 2/225* (2013.01); *B60N 2/02253* (2023.08)

(58) Field of Classification Search
CPC . B60N 2/02246; B60N 2/225; B60N 2/02253
See application file for complete search history.

(56) References Cited

U.S. PATENT DOCUMENTS

| | | | | |
|---|---|---|---|---|
| 10,830,310 B2* | 11/2020 | Hudson | .................... | B60N 2/10 |
| 11,180,064 B2* | 11/2021 | Navatte | .................. | B60N 2/166 |
| 2018/0216717 A1* | 8/2018 | Thotakuri | ............. | F16H 57/021 |
| 2020/0101884 A1 | 4/2020 | Navatte | | |

FOREIGN PATENT DOCUMENTS

| | | | | |
|---|---|---|---|---|
| DE | 202017106652 U1 | 11/2017 | | |
| DE | 102019126568 | * 4/2020 | ............... | B60N 2/16 |
| FR | 2991926 A1 | 12/2013 | | |
| FR | 3086597 A1 | 4/2020 | | |

OTHER PUBLICATIONS

French Preliminary Search Report for FR2203990 dated Dec. 12, 2022, 8 pages, No English translation available.

* cited by examiner

*Primary Examiner* — Milton Nelson, Jr.
(74) *Attorney, Agent, or Firm* — Barnes & Thornburg LLP (57) ABSTRACT

A motorized drive device for a vehicle seat having a squab in particular with raising, the device comprising an actuator and an actuator housing containing a reduction gear, an output member, mounted to rotate about an axis, the output member comprising a peripheral rim, a friction ring mounted around the output member and rotationally integral with the output member, the friction ring comprising a skirt, the actuator housing comprising an inner bearing optionally provided with a plurality of inner radial protrusions for receiving the skirt, the skirt coming into contact at least against the inner bearing in order to generate a continuous friction between the output member forming a rotating part and the inner bearing forming a fixed part.

20 Claims, 9 Drawing Sheets

MOTORIZED DRIVE DEVICE FOR RAISING A VEHICLE SEAT

PRIORITY CLAIM

This application claims priority to French Patent Application No. FR2203990, filed Apr. 28, 2022, which is expressly incorporated by reference herein.

BACKGROUND

The present disclosure relates to motorized drive devices for a vehicle seat, the seat having a squab frame arranged on a base, the squab being equipped with a squab-raising movement.

SUMMARY

According to the present disclosure, a motorized drive device for a vehicle seat having a squab frame, the drive device being intended to drive the movement of a movable element connected to the squab frame, in particular for a seat raising movement.

In illustrative embodiments, the device comprises an actuator and an actuator housing containing at least one reduction gear, an output member, mounted to rotate about an axis, the output member comprising a peripheral rim, a friction ring mounted around the output member and rotationally integral with the output member, the friction ring comprising a skirt, the actuator housing comprising an inner bearing for receiving the skirt, the skirt being in contact with at least the inner bearing in order to form a friction brake between the output member forming a rotating part and the inner bearing forming a fixed part.

In illustrative embodiments, the contact between the skirt and the inner bearing of the housing is a linear contact or a surface contact, this contact area generates a friction which is exerted as a brake when a rotation torque is applied to the output pinion.

In illustrative embodiments, the contact of the skirt which carries on the fixed inner bearing produces a braking effect, regardless of the angular position of the output pinion. This makes it possible to push back the torque limit applied to the output pinion for which the functional clearance manifests itself. In other words, it is necessary to apply a torque higher than a predetermined threshold on the output pinion, so that the pinion rotates and the clearance is compensated for. Below the predetermined threshold, the pinion does not turn at all and the functional clearance of the reduction gear is consequently masked. Advantageously, the predetermined threshold is higher than in the comparative embodiments.

In illustrative embodiments, the inner bearing is not necessarily circular or cylindrical as will be seen below.

In illustrative embodiments, the inner bearing may have a discontinuous surface and/or protrusions, facing a smooth skirt surface.

In illustrative embodiments, the inner bearing may have a continuous surface with respect to a skirt surface with radial protrusions.

In illustrative embodiments, one and/or the other of the following arrangements may also be used.

In illustrative embodiments, the skirt has generally circular symmetry at rest and is oval under stress once assembled inside the inner bearing; whereby the oval and/or elliptical deformation makes it possible to create a braking torque while minimizing the wear of the skirt throughout the life cycle.

In illustrative embodiments, the skirt can comprise radially outward protrusions, which protrude from the general radially symmetrical shape, the radial protrusions causing the skirt, once it is inserted into the bearing, to take on an oval shape. In this case, the bearing may be smooth and cylindrical without interruption, without protrusion or hollows.

In illustrative embodiments, the inner bearing can be provided with a plurality of inner radial protrusions protruding radially inwards, thus the skirt, generally having circular symmetry at rest, is reshaped by the inner radial protrusions into an oval under stress once assembled inside the inner bearing. In this way, these radial protrusions contribute to creating a deformation stress in the skirt of the friction ring, the resilient deformation creating the desired contact area(s). The skirt bears and rubs in particular against the inner radial protrusions.

In illustrative embodiments, the inner bearing can comprise one or more cylindrical bearing portions with rotational symmetry and the inner radial protrusions protrude radially inwards relative to these cylindrical portions. The radial protrusions form beads from a generally cylindrical shape. It is thus possible to control the geometry of the elliptical deformation of the skirt.

In illustrative embodiments, the skirt can bear and rub in some places against the cylindrical portions of the inner bearing of the actuator housing. Consequently, the contact and friction of the skirt occur not only on the inner radial protrusions but also on the cylindrical portions; the contact surface is thus increased.

In illustrative embodiments, a first group of inner radial protrusions and a second group of inner radial protrusions can be provided, the two groups being diametrically opposed; as such, the ovalization effect is thus well-controlled. The minor axis of the ellipse is imposed by the inner radial protrusions and the major axis of the ellipse is orthogonal to the small axis and the ends of the skirt on the major axis side are wedged against the cylindrical bearing portions.

In illustrative embodiments, the friction ring is formed as a single molded part made of resilient plastic material; the proposed solution is thus particularly advantageous from an economic point of view.

In illustrative embodiments, the skirt has an outer diameter D5 at rest of at least 35 mm, and preferably at least 40 millimeters. This is done on a larger radius than in comparative ring configurations. The lever arm to create a braking torque is greater.

In illustrative embodiments, the skirt also bears on the radially inner side on the peripheral rim of the output member. The skirt is sandwiched between the inner bearing of the housing and the peripheral rim. This makes it possible to increase the friction and the braking effect.

In illustrative embodiments, there are provided notches or ribs directed inwardly to come into contact with the peripheral rim. The support is thus more reliable on the peripheral rim by controlling the sum of the bearing surfaces. There is thus proper control of the sandwich effect.

In illustrative embodiments, the notches or ribs are regularly distributed around the circumference. The ring and the skirt rotate integrally with the output member, and advantageously, the braking torque is fairly constant over the 360° of rotation of the output member.

In illustrative embodiments, the actuator housing comprises a casing made of plastic or a light alloy and a metal cover, and the inner bearing, with the inner radial protrusions where appropriate, is made in the casing. The protrusions are derived from molding. This leads to good cost-effectiveness.

In illustrative embodiments, the inner bearing, with where appropriate the inner radial protrusions, can be made in the metal cover. This makes the inner bearing very durable.

In illustrative embodiments, the friction ring comprises a neck whose inner shape is generally complementary to a toothing of the output pinion. This allows for robust rotation of the friction ring, preferably without clearance.

In illustrative embodiments, the neck serves to center the output member on the axis by mating with an axial bore of the cover. This provides for the centering of the output member on the axis A1 defined by the bore of the cover.

In illustrative embodiments, the neck comprises inner recesses for receiving the teeth of the pinion and, on the radially outer side, a cylindrical bearing surface received in the axial bore of the cover. The neck is of an ad-hoc shape for rotational driving and geometric centering on the axis.

In illustrative embodiments, the friction ring comprises a perforated plate. This facilitates the deformation and the oval-reshaping of the skirt.

In illustrative embodiments, the braking torque induced by the contact is at least equal to 3 N·m. The perception limit of the clearance of the reduction gear is pushed back in the event of a change in loading polarity.

In illustrative embodiments, the reduction gear is of the hypocycloid type with an Oldham coupling. This type of gearbox is compact and provides a significant reduction rate.

In illustrative embodiments, the inner radial protrusions circumscribing a first pitch circle C1, and the skirt at rest is circumscribed in a second pitch circle C2, the diameter of C2 being greater than the diameter of C1. The assembly induces a prestress which results in the skirt taking on an oval shape, and the contact against the inner bearing gives the desired effect of the friction brake.

In illustrative embodiments, the skirt comprises a succession of segments substantially forming ropes, the adjacent segments two by two being connected together by bent junctions. In other words, in this case, in cross-section transverse to the axis, the skirt generally has a polygonal shape.

In illustrative embodiments, the skirt comprises waves or corrugations, which at rest have a radial dimension greater than a radial gap (E1) between the peripheral rim and the inner bearing, the waves or corrugations being compressed in the radial direction once the skirt is inserted between the peripheral rim and the inner bearing. This provides contact with radial pre-stress having the desired friction braking effect.

The present disclosure also relates to a vehicle seat comprising one or more motorized drive devices as described above.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the various figures, the same references designate identical or similar elements.

Figure 1:
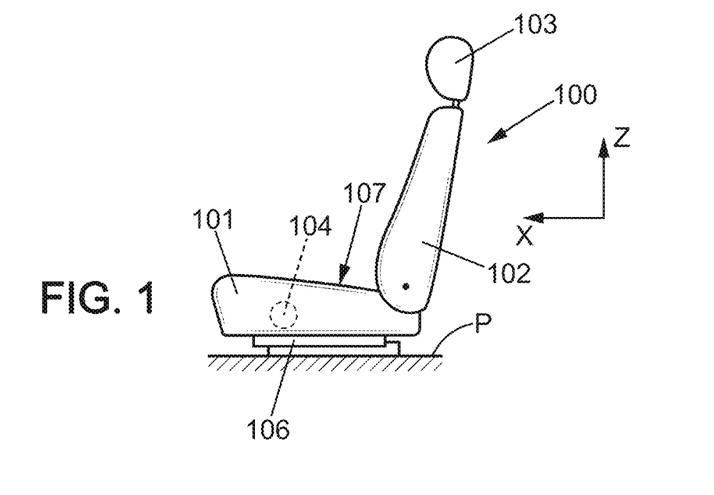
FIG. 1 is a schematic side view of a seat structure comprising a drive device according to one embodiment of the present disclosure.

FIG. 1 schematically depicts a vehicle seat 100 comprising a squab 107 with a squab frame 101, a backrest 102 mounted on the seat, a headrest 103, all being mounted on a base with longitudinal sliders 106, connected to the floor P of the vehicle.

The seat may be equipped with one or more articulation mechanisms to conform to the morphology and preferences of the occupant.

This or these articulation mechanisms can comprise in particular a raising mechanism of the squab 107.

The raising kinematics of a squab may employ one or more connecting rods connecting the baseplate to the squab frame. The raising may be uniform or may be selective, namely the anterior raising movement may be independent of the posterior raising movement.

At least one of the connecting rods may comprise a toothed sector that mechanically engages with a motorized drive device 104 which is the main object of the present disclosure.

It should be noted that a seat may contain a single motorized drive device 104 of the type described below, but the seat may contain two motorized drive devices, or even more than two.

Figure 2:
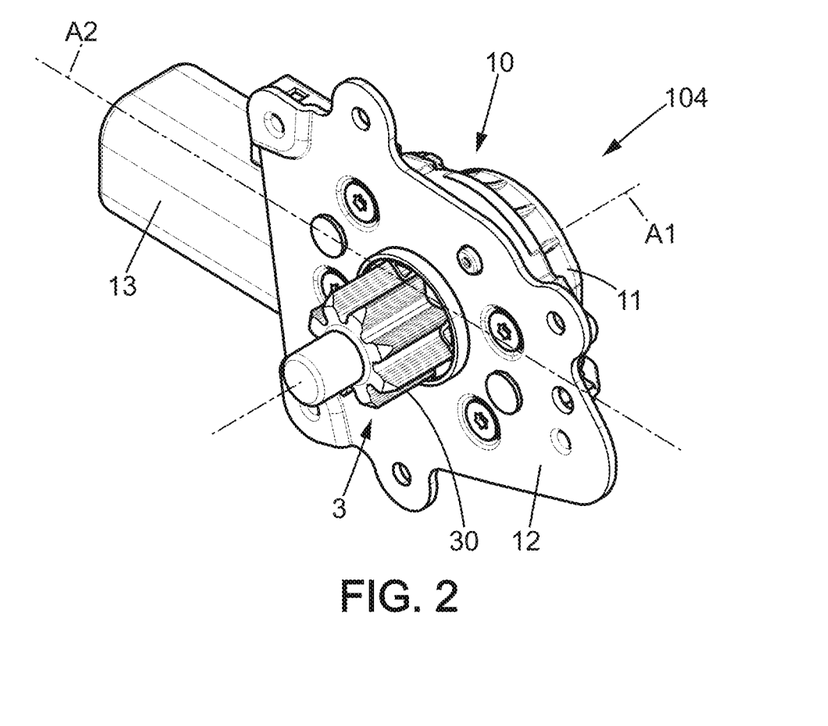
FIG. 2 shows in perspective an example of a drive device for the raising movement of the seat of FIG. 1.
Figure 3:
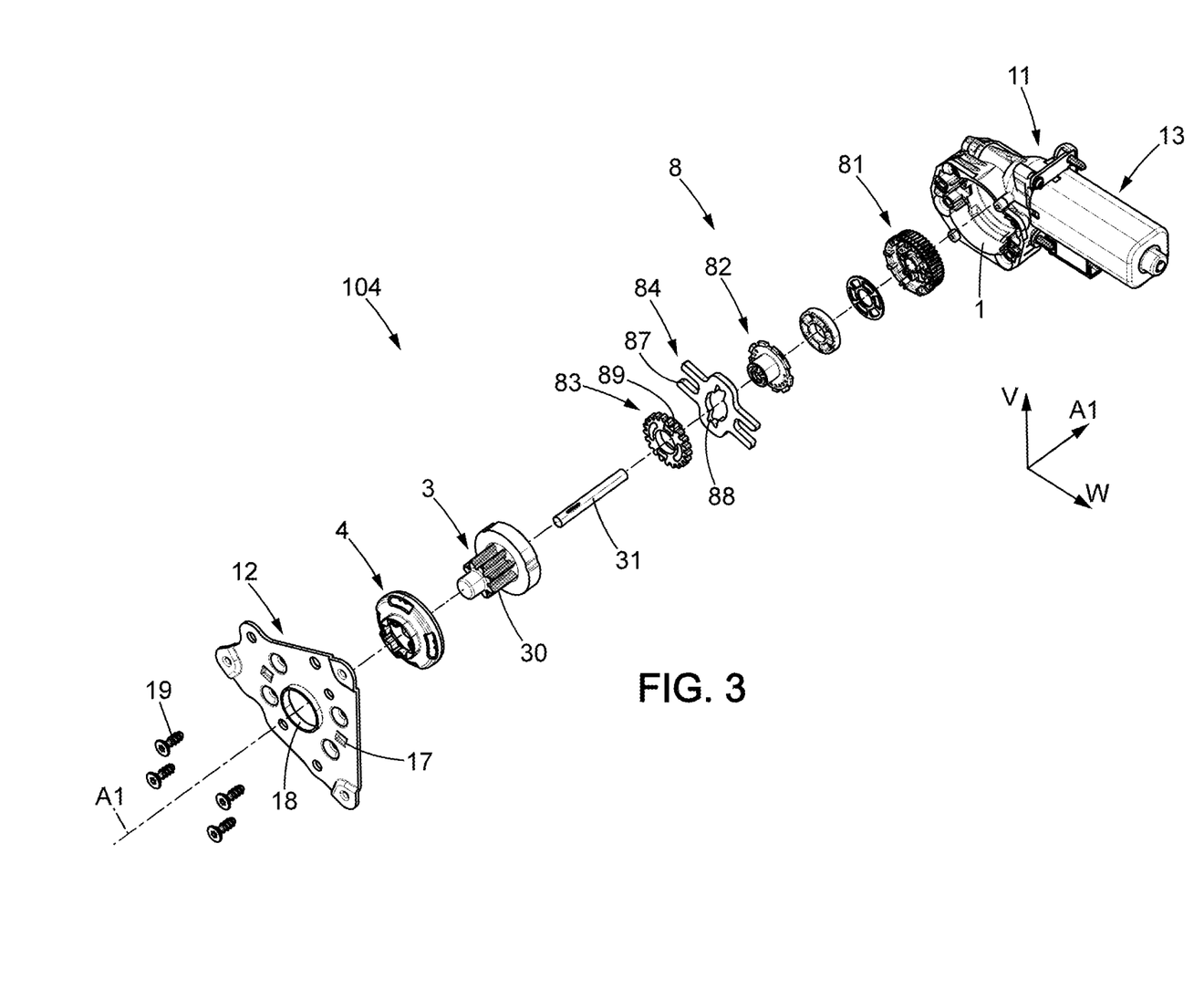
FIG. 3 is an exploded perspective view of the drive device of FIG. 2, seen from a first side.
Figure 4:
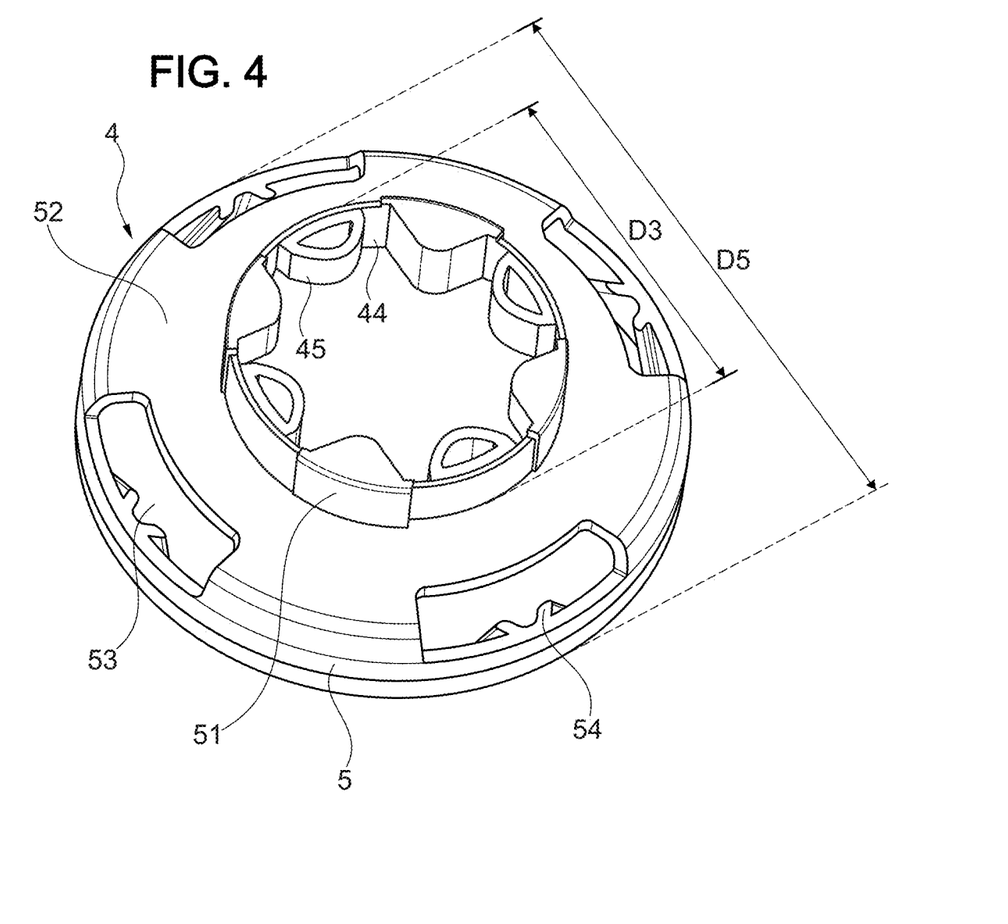
FIG. 4 shows an exemplary embodiment of the friction ring.
Figure 4A:
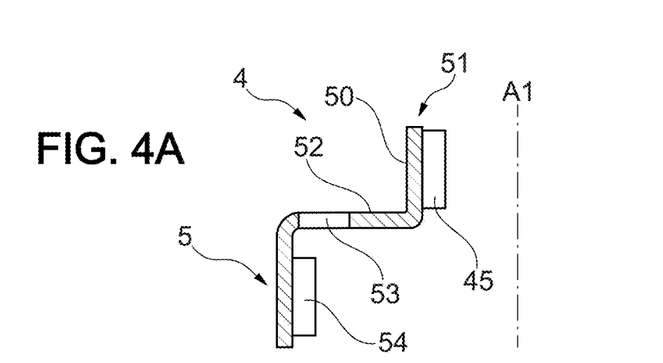
FIG. 4A shows the profile of the friction ring.

With reference to FIGS. 2 and 3, the motorized drive device 104 comprises a motor 13, an actuator housing 10 with a casing 11 and a cover 12, and an output member 3.

The actuator housing 10 comprises a reduction gear that will be described below, the actuator housing is also referred to as a gearbox housing.

The casing 11 is shaped like a bell. In the illustrated example, the casing 11 is formed of plastic material. Such plastic material may be ABS, polypropylene, polyethylene, polyamide, or any suitable plastic material. However, the casing could also be formed from an aluminum alloy, magnesium alloy, any suitable lightweight metal alloy.

The actuator housing comprises an inner bearing 1 whose usefulness will be specified below.

The motor 13 extends along the axis A2 and comprises a rotor which carries a helical gear screw centered on the axis A2. The helical gear screw is engaged on an input wheel of the reduction gear 81. The reduction gear 8 is described in more detail below.

The cover 12 closes the plastic 11. The cover 12 is formed as a metal flange. The cover allows a solid and robust attachment of the motorized drive device to a seat frame element (onboard the squab or not).

The output member 3 comprises a toothed pinion 30. Its toothing comes into constrained engagement in a toothed sector located across from it in one of the connecting rods.

The output member 3 comprises a peripheral rim 2. The peripheral rim 2 has a diameter D2.

In the example illustrated in FIG. 3, an axis shaft 31 is provided centered on the axis A1 and on which the output pinion 3 rotates.

Figure 6:
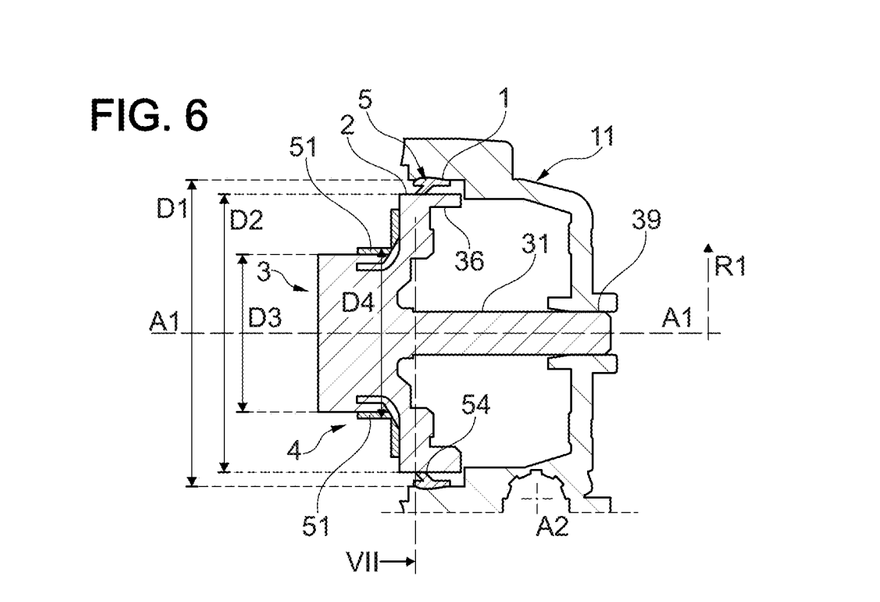
FIG. 6 shows, in axial section view, certain elements of the drive device, in particular the output member, the casing and the friction ring.
Figure 9:
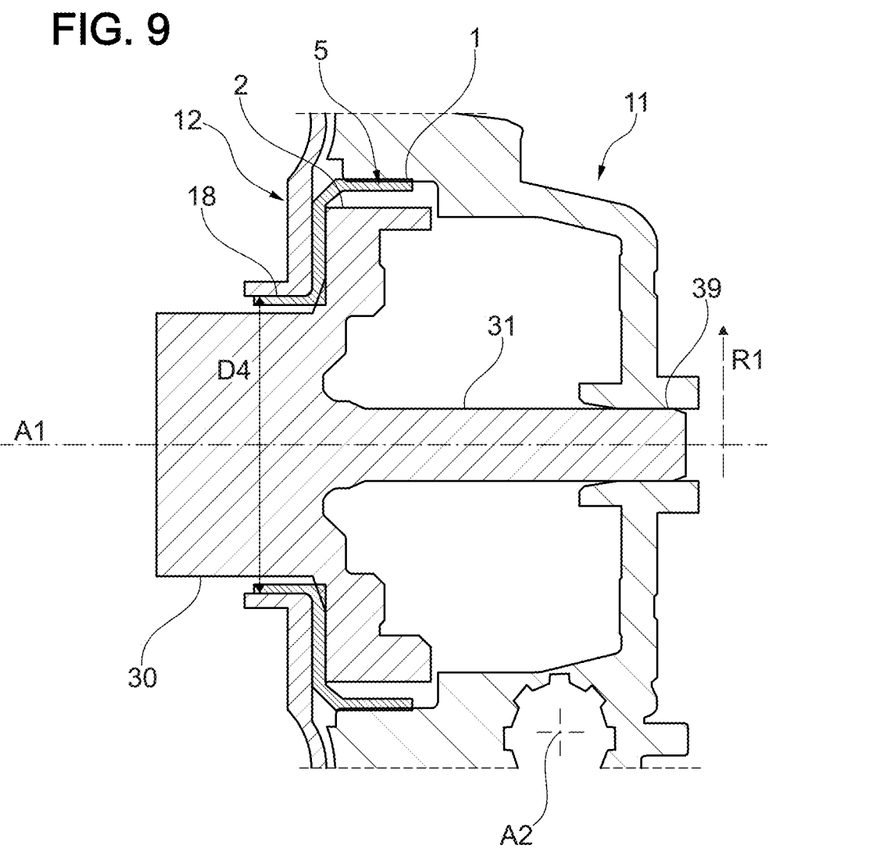
FIG. 9 shows, in axial section view, certain elements of the drive device, in particular the output member, the casing and the friction ring, according to yet another embodiment.
Figure 14:
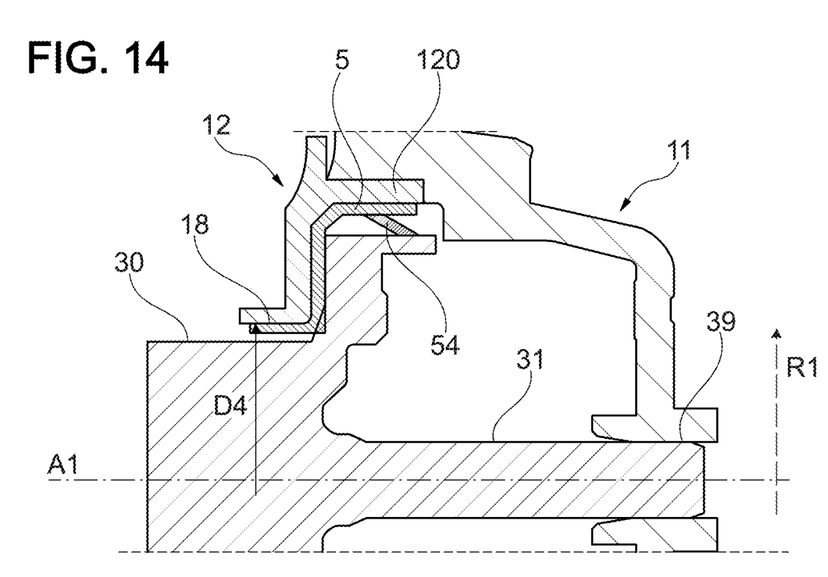
FIG. 14 shows, in a partial axial sectional view, according to yet another embodiment in which the inner bearing is formed in the cover of the housing.

In the sections shown in FIGS. 6, 9, 14, a further embodiment in which the output member 3 is formed integrally with its shaft 31 is illustrated. The two variants are therefore possible, independent of the variants described on the friction ring 4. On the bottom of the casing, the shaft of the casing is received in an axial bearing 39, visible in FIGS. 6, 9 and 14.

The output member 3 comprises a radially inner toothing 36, and the peripheral rim 2 comprises a generally cylindrical outer surface arranged at least partially at the same axial position as the radially inner toothing.

Figure 8:
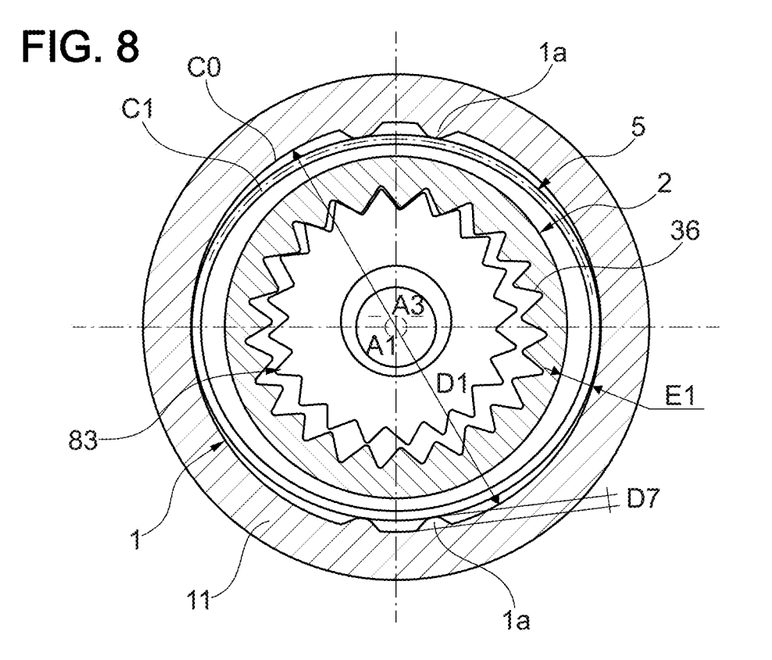
FIG. 8 is similar to FIG. 5 and shows in cross-section, according to an alternative embodiment.

There remains a radial interval E1 between the peripheral rim 2 and the inner bearing 1, as seen in FIG. 8.

The inner bearing 1 may comprise one or more cylindrical portions 1b coincident with a diameter D1 and the pitch circle C1. There may be two such cylindrical portions, diametrically opposite one another.

Figure 5:
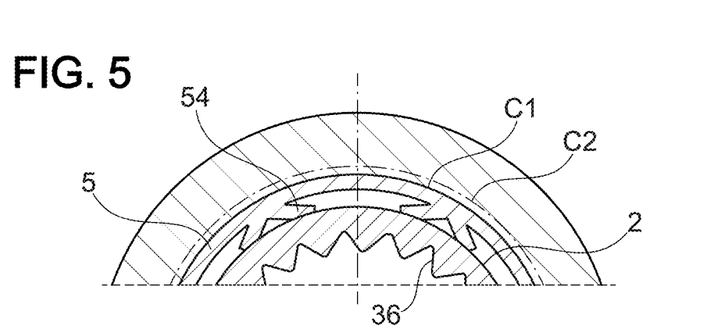
FIG. 5 shows, in a partial view, a cross-section transverse to the axis of the drive device, the skirt of the friction ring on the inner bearing.

In a simple example, visible in FIG. 5, the bearing forms a continuous cylinder, for example over an angular range of 360°, or discontinuous on disjoint angular sectors.

The contact pre-stress results from force-fitting with resilient deformation of the skirt with a diameter at rest D5 (circle C2) that is inserted into the diameter at rest D1 (circle C1).

The outer diameter D5 of the skirt 5, at rest, is at least 35 mm. Preferably, for D5 a value close to 40 mm or greater than 40 millimeters is chosen. It is also possible to choose D5 close to 45 mm.

Figure 7:
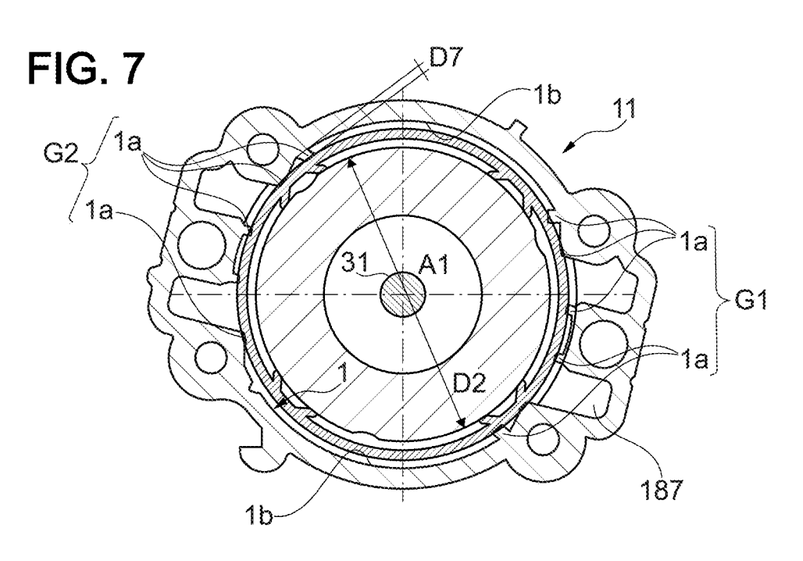
FIG. 7 shows, in a partial cross-sectional view, along the cross-section line VII-VII in FIG. 6, the skirt of the ring being in friction contact on the inner bearing, according to another embodiment.

According to another example illustrated in particular FIG. 7 interruptions are provided, in particular for reasons of removing the plastic part from the mold.

According to an advantageous option, the inner bearing 1 is provided with a plurality of inner radial protrusions 1' protruding radially inward from the inner bearing. The inner radial protrusions are called bosses or beads. The inner bearing may be defined with reference to a cylinder of diameter D1. The inner radial protrusions protrude radially towards the inside of an exceeding of a distance D7 which may range from 0.1 mm to a few tenths of a millimeter or even up to 3 mm.

It is noted that the pitch circle C0 which coincides with the general cylindrical shape of the inner bearing is larger than the pitch circle C1 circumscribed inside the radial protrusions (see FIG. 8).

In the example illustrated in FIG. 7, a first group G1 of inner radial protrusions and a second group G2 of inner radial protrusions are provided, the two groups G1, G2 being diametrically opposed.

Friction Ring

The motorized drive device 104 comprises a friction ring 4. The following paragraphs generally relate to the friction ring and apply, unless otherwise mentioned, to all the embodiments and all the variants.

The friction ring 4 is formed as a single molded plastic part. Regarding the material, it is preferable to choose a polyamide, a polypropylene, a polyoxymethylene with a high creep strength. Any other plastic material resistant to creep and abrasion could also be suitable.

The friction ring 4 comprises a neck 51 a tray 52 and a skirt 5. The skirt 5 of the interface ring is interposed, in a radial direction R1, between the inner bearing 1 and the peripheral rim 2 of the output member, as can be seen in FIGS. 5 to 9, 11, 14.

The tray 52 extends perpendicular to the axis A1. The tray 52 is interposed between the neck 51 and the skirt 5. One or more recesses 53 may be provided on the tray to facilitate the deformation and oval-reshaping of the skirt.

The friction ring 4 is mounted around the output member 3, and it is secured in rotation to the output member. In the example illustrated, the neck 51 comprises, towards the interior, hollow zones 44 and bumps 45 forming a profile complementary to the toothing 30 of the output pinion 3. In the example illustrated, the neck 51 comprises, towards the exterior, a smooth cylindrical bearing 50, with diameter D4. The neck 51 is received in the axial bore 18 of the cover.

Generally, the skirt 5 at least comes in contact with the inner bearing 1. This generates a frictional braking effect between the output member forming a rotating part and the inner bearing 1 forming a fixed part. Preferably, this friction exists regardless of the angular position of the output member relative to the gearbox housing; in other words, there is a continuous friction effect, relatively constant over one revolution of the output member 3.

In a first embodiment illustrated in FIGS. 3 to 7, the skirt rubs against the inner radial protrusions 1' when the inner bearing is equipped therewith. Four openings 53 are provided.

It will be noted that the skirt generally has circular symmetry at rest. It has an outer diameter at rest, denoted D5, represented by the circle C2 in FIG. 5.

When the bearing 1 is provided with inner radial protrusions, after assembly, as can be seen in FIG. 8, the friction skirt takes on an oval shape under stress inside the inner bearing, caused by the inner radial protrusions 1a.

In the case of the presence of inner radial protrusions 1a the small axis of the ellipse is constrained by the available distance between the diametrically opposed protrusions and about the major axis of the ellipse, the friction of the skirt occurs directly on the cylindrical portions 1b the inner bearing. The total contact surface may be quite high, in angular range this may represent a few tens of degrees.

The output pinion 30 has a diameter D3 smaller than that D2 of the peripheral rim 2.

In one embodiment, D2>1.4 D3. In another embodiment, D2>1.7 D3. In another embodiment, D2>2×D3.

In view of the dimensions of D2, it is noted that the frictional contact of the skirt 5 works with significant leverage relative to the axis A1.

The diameter of the pitch circle of the bearing is identified as D1. D1 is at least 35 mm, preferably at least equal to 40 mm.

D1=D2+E1, where E1 takes a value between 1 mm and 4 mm, as shown in FIG. 8.

Figure 10A:
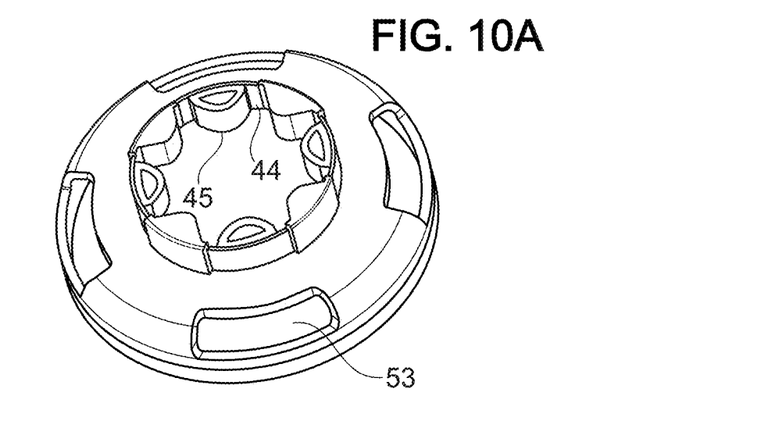
FIGS. 10A and 10B illustrate in perspective view, respectively from each side, the friction ring used in the assembly of FIG. 9.
Figure 10B:
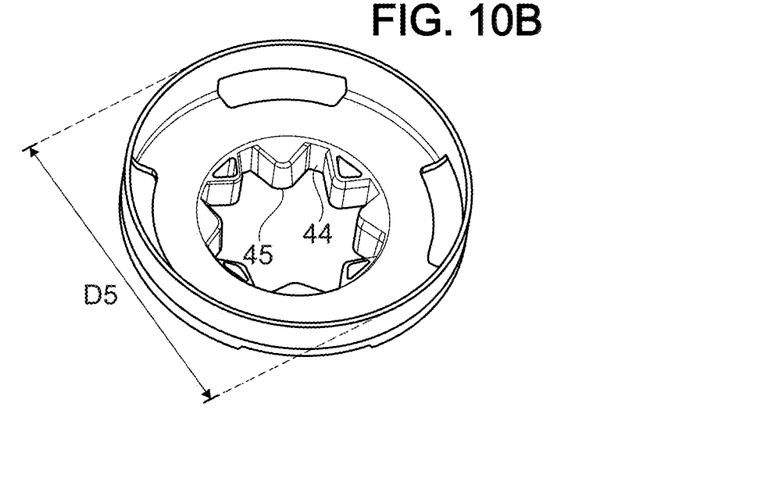

FIGS. 9, 10A and 10B

With reference to FIGS. 9, 10A, 10B, in a second embodiment of the friction ring, the skirt 5 at rest has a cylindrical wall with rotational symmetry without ribs directed inwards or outwards.

When the inner radial protrusions of the inner bearing are present, the oval-reshaping effect is found as shown in FIG. 8.

In general, the inner radial protrusions circumscribe a first pitch circle C1. The skirt at rest is circumscribed in a second pitch circle C2. The diameter of C2 is greater than the diameter of C1. For example C2 is between C1 and 1.10× C1.

It should be noted that the insertion of the skirt into the inner bearing is done with a stress, which results in the assembled configuration in a permanent residual pre-stress which is conducive to the friction brake effect explained above.

Figure 11:
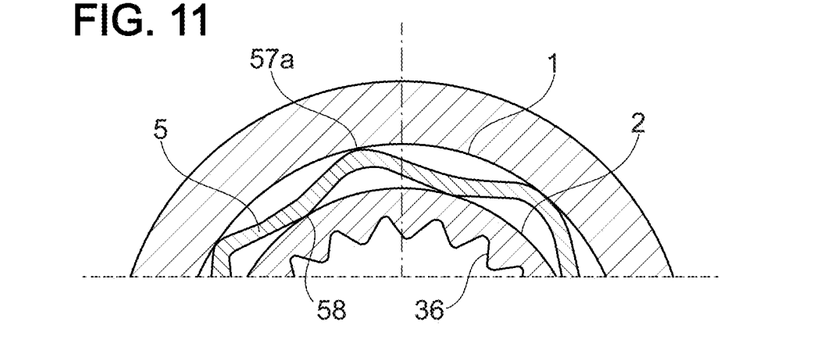
FIG. 11 shows, in a partial cross-sectional view, the skirt of the friction ring on the inner bearing, according to yet another embodiment.
Figure 12:
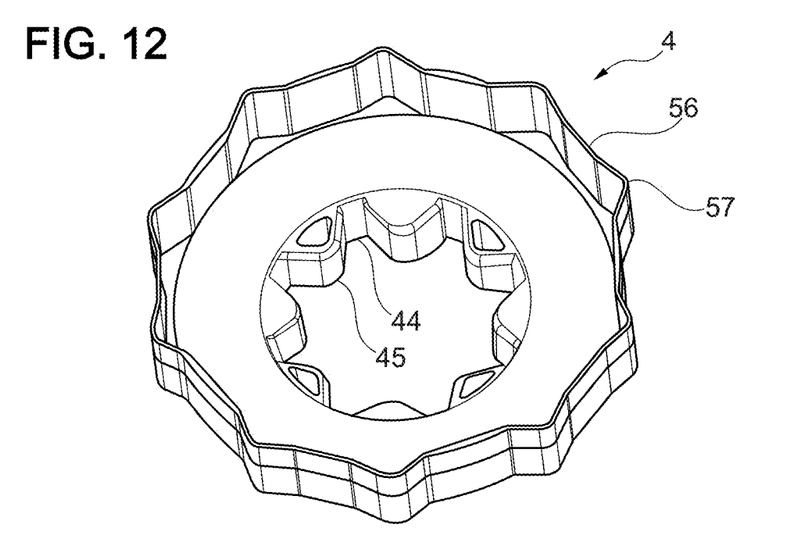
FIG. 12 illustrates in perspective view, from the side of the skirt, the friction ring used in the assembly of FIG. 11.

FIGS. 11 and 12

In this third embodiment, the skirt has a general polygonal shape along a cross-section transverse to the axis. Along the circumference of the skirt, there are segments 56 substantially straight, and rounded junctions and bends 57. The polygonal shape may be decagonal, dodecagonal, or contain even more segments.

The contact against the inner bearing of the housing occurs in the area of the vertices 57a joining portions. It may also be provided according to the geometry that the segments forming a rope also contact the peripheral rim in an area 58 mid-way between the vertices 57a.

As illustrated in the figures, it is noted that the segments forming a rope 56 may have an inverted curvature relative to the axis.

In a similar and generalized variant embodiment with respect to that shown in FIG. 12, the skirt 5 comprises waves or corrugations, which at rest have a radial dimension greater than the radial interval E1 between the peripheral rim and the inner bearing. The inner bearing 1 may be cylindrical and smooth here, i.e. without the inner radial protrusions discussed above.

Here, the term "radial dimension of the skirt" means the difference between the maximum occupied radius and the minimum occupied radius, taken relative to the axis.

Once the skirt is inserted between peripheral rim and inner bearing 1, the waves or undulations are compressed in the radial direction and provide the contact with radial pre-stress to achieve the brake effect.

Figure 13:
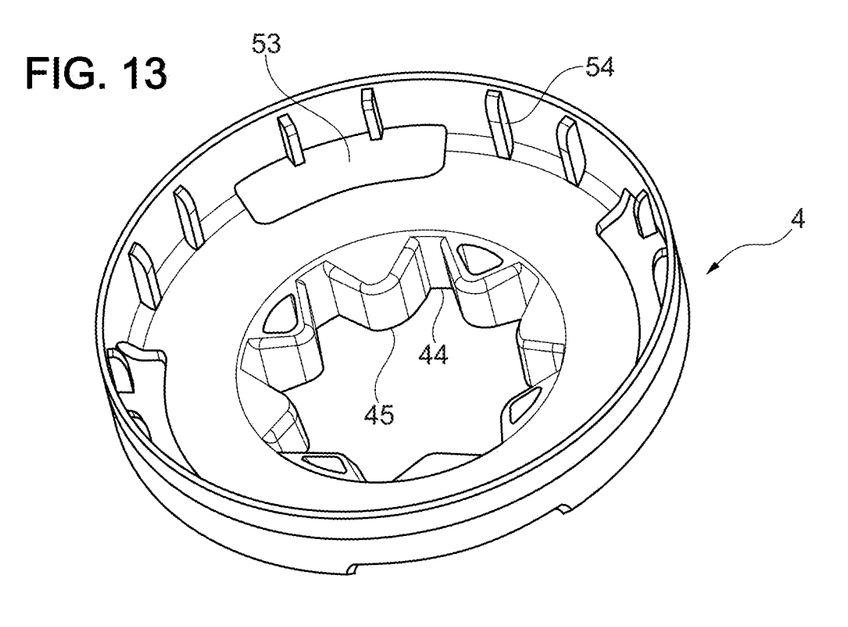
FIG. 13 illustrates in perspective view, from the side of the skirt the friction ring according to another embodiment.

FIG. 13.

In FIG. 13, another variant of friction ring 5 has been shown. A plurality of inner walls is provided in this ring 54 extending parallel to the axis A1. Walls 54 are regularly distributed around the circumference. The walls 54 are also called notches or ribs. By virtue of these panels, the interposition of the skirt between the peripheral rim 2 and the inner bearing of the housing 1 is done with a radial stress which contributes to providing homogeneous contact around the circumference and thus controlled, the desired friction brake effect.

FIG. 14.

According to an alternative embodiment, the inner bearing 1 is not formed in the plastic casing, but is formed in the cover 12 by means of a circular wall or "joggling" denoted 120. The principle of friction of the skirt on the inner bearing is similar or identical to what has been discussed above. There may also be bosses on the inner bearing formed in the cover in order to obtain the oval-reshaping effect described above.

Reduction Gear

In the example presented in the figures, an eccentric reduction gear with an Oldham coupling has been illustrated. However, naturally another type of reduction gear could be housed inside the gearbox housing.

More particularly, in the example of the reduction gear 8 illustrated here, the input wheel 81 drives, directly or indirectly, an eccentric portion 82 received in an axial bore of an orbital pinion 83. The orbital pinion 83, under the effect of the rotation of its eccentric portion, sees its axis A3 describing an orbital movement of a radius equivalent to the eccentricity of the eccentric portion (see FIG. 8). Furthermore, the orbital pinion comprises an external circular peripheral toothed area which is permanently embedded, for part of the toothing, in the inner radial toothing 36 of the output member 3 already mentioned and located radially outside the orbital pinion 83.

In addition, the orbital pinion 83 comprises pins 89 protruding in the axial direction and received in grooves 88 of a guide part called a slider 84 which is detailed hereinafter.

The slider 84 is arranged to be able to move only in translation without a rotational movement about the axis A1, consequently, the orbital pinion 83 undergoes a movement about the axis A1 without turning about the axis A1. Furthermore, as illustrated in FIG. 8, the number of external teeth of the orbital pinion 83 is less than the number of teeth of the inner radial toothing 36 of the output member 3, the orbital movement of the orbital pinion 83 causes the output member 3 to rotate. In the illustrated example where the difference between the number of teeth between two toothed sectors is one tooth, each time the eccentric portion 82 rotates by one revolution, the inner radial toothing 36 of the output member moves by one tooth in rotation about the axis A1.

In one typical example, the orbital pinion comprises thirty-five teeth while the inner radial toothing 36 comprises thirty-six teeth, which gives a reduction ratio of 35 for the reduction gear 8.

The slider 84 comprises four arms 87 that extend in a plane perpendicular to the axis A1 and that are received in grooves 187 formed in the plastic casing 11 to allow a translational movement in the direction W perpendicular to the axis A1 and prevent any rotation of the slider 84 about the axis A1. In addition, the slider comprises the grooves 88 extending in the direction V perpendicular to the direction W and in the axial direction A, both protruding pins 89 diametrically opposed that engage in the grooves 88.

Thus, the orbital pinion 83 can translate in a direction V inside the slider, but without rotation around A1; the slider 84 can translate relative to the axis W in the baseplate, but again without rotation around A1. This assembly is also referred to as an Oldham coupling. Indeed, these two translations make it possible to compensate for the orbital movement created by the eccentric portion so that the movement of the output member 3 is exactly coaxial with the input rotational movement of the input wheel 81.

The slider 84 is received in a base formed in the plastic casing 11. The slider is made of metal, it is generally secured inside the casing 11 by means of four studs 17 inserted between the arms 87 of the slider.

Furthermore, the attachment screws 19 come to frame the arms of the slider from the outside. The attachment screws 19 allow the cover to be assembled 12 on the plastic casing 11 and thus form the closed actuator housing 10.

OTHER POINTS

It will be noted that the braking torque is substantially constant over one revolution of an output pinion.

It should be noted that the motorized drive device could be used to motorize a seat adjustment movement other than raising a squab.

Instead of using a motor on an axis orthogonal to the output pinion, a motor could be used in the same axis.

Likewise, instead of using an eccentric reduction gear with an Oldham coupling, a planetary reduction gear could be used.

According to one possibility, the inner bearing may have a discontinuous surface and/or protrusions, facing a smooth skirt surface, as is shown in FIG. 13.

According to one possibility, the inner bearing may have a continuous surface with respect to a skirt surface with radial protrusions as shown in FIG. 14.

The present disclosure relates to motorized drive devices for a vehicle seat, the seat having a squab frame arranged on a base, the squab being equipped with a squab-raising movement.

In this type of configuration, an actuator is provided with an output member driven selectively in rotation to make the squab frame rise and/or fall. The output member, or output pinion, comprises a toothing engaged with a toothed sector facing each other.

The motorized drive device comprises a reduction gear with a high reduction ratio in order to change from a rapid rotation of the electric motor to a slow or very slow rotation of the output pinion. The reduction gear in question has a functional clearance necessary for its operation in all circumstances. This clearance is present in particular when the electric motor is not controlled and the output pinion is not supposed to move.

Furthermore, the squab raising movement may be provided with an upward resilient return system in order to compensate for all or some of the weight of the occupant seated on the seat, and secondarily to a part of the weight of the seat itself.

The clearance of the reduction gear can be perceptible in particular in the situations when the load polarity changes, for example when an occupant sits down on the seat or when an occupant leaves the seat.

That is why the inventors have sought to mask the presence of the functional clearance of the reduction gear.

To this end, there is proposed here a motorized drive device for a vehicle seat having a squab frame, the drive device being intended to drive the movement of a movable element connected to the squab frame, in particular for a seat raising movement, the device comprising:
 an actuator and an actuator housing containing at least one reduction gear,
 an output member, mounted to rotate about an axis, the output member comprising a peripheral rim,
 a friction ring mounted around the output member and rotationally integral with the output member, the friction ring comprising a skirt,
 the actuator housing comprising an inner bearing for receiving the skirt,
 the skirt being in contact with at least the inner bearing in order to form a friction brake between the output member forming a rotating part and the inner bearing forming a fixed part.

By virtue of these arrangements, the contact between the skirt and the inner bearing of the housing is a linear contact or a surface contact, this contact area generates a friction which is exerted as a brake when a rotation torque is applied to the output pinion.

The contact of the skirt which carries on the fixed inner bearing produces a braking effect, regardless of the angular position of the output pinion. This makes it possible to push back the torque limit applied to the output pinion for which the functional clearance manifests itself. In other words, it is necessary to apply a torque higher than a predetermined threshold on the output pinion, so that the pinion rotates and the clearance is compensated for. Below the predetermined threshold, the pinion does not turn all and the functional clearance of the reduction gear is consequently masked. Advantageously, the predetermined threshold is higher than in the comparative embodiments.

It will be noted that the inner bearing is not necessarily circular or cylindrical as will be seen below.

According to one possibility, the inner bearing may have a discontinuous surface and/or protrusions, facing a smooth skirt surface.

According to another possibility, the inner bearing may have a continuous surface with respect to a skirt surface with radial protrusions.

In various embodiments of the present disclosure, one and/or the other of the following arrangements may also be used.

According to another aspect, the skirt has generally circular symmetry at rest and is oval under stress once assembled inside the inner bearing; whereby the oval and/or elliptical deformation makes it possible to create a braking torque while minimizing the wear of the skirt throughout the life cycle.

According to one aspect, the skirt can comprise radially outward protrusions, which protrude from the general radially symmetrical shape, the radial protrusions causing the skirt, once it is inserted into the bearing, to take on an oval shape. In this case, the bearing may be smooth and cylindrical without interruption, without protrusion or hollows.

According to one aspect, the inner bearing can be provided with a plurality of inner radial protrusions protruding radially inwards, thus the skirt, generally having circular symmetry at rest, is reshaped by the inner radial protrusions into an oval under stress once assembled inside the inner bearing. In this way, these radial protrusions contribute to creating a deformation stress in the skirt of the friction ring, the resilient deformation creating the desired contact area(s). The skirt bears and rubs in particular against the inner radial protrusions.

According to another aspect, the inner bearing can comprise one or more cylindrical bearing portions with rotational symmetry and the inner radial protrusions protrude radially inwards relative to these cylindrical portions. The radial protrusions form beads from a generally cylindrical shape. It is thus possible to control the geometry of the elliptical deformation of the skirt.

According to another aspect, the skirt can bear and rub in some places against the cylindrical portions of the inner bearing of the actuator housing. Consequently, the contact and friction of the skirt occur not only on the inner radial protrusions but also on the cylindrical portions; the contact surface is thus increased.

According to another aspect, a first group of inner radial protrusions and a second group of inner radial protrusions can be provided, the two groups being diametrically opposed; as such, the ovalization effect is thus well-controlled. The minor axis of the ellipse is imposed by the inner radial protrusions and the major axis of the ellipse is orthogonal to the small axis and the ends of the skirt on the major axis side are wedged against the cylindrical bearing portions.

According to another aspect, the friction ring is formed as a single molded part made of resilient plastic material; the proposed solution is thus particularly advantageous from an economic point of view.

According to another aspect, the skirt has an outer diameter D5 at rest of at least 35 mm, and preferably at least 40 millimeters. This is done on a larger radius than in comparative ring configurations. The lever arm to create a braking torque is greater.

In another aspect, the skirt also bears on the radially inner side on the peripheral rim of the output member. The skirt is sandwiched between the inner bearing of the housing and the peripheral rim. This makes it possible to increase the friction and the braking effect.

According to another complementary aspect, there are provided notches or ribs directed inwardly to come into contact with the peripheral rim. The support is thus more reliable on the peripheral rim by controlling the sum of the bearing surfaces. There is thus proper control of the sandwich effect.

According to another aspect, the notches or ribs are regularly distributed around the circumference. The ring and the skirt rotate integrally with the output member, and advantageously, the braking torque is fairly constant over the 360° of rotation of the output member.

According to another aspect, the actuator housing comprises a casing made of plastic or a light alloy and a metal cover, and the inner bearing, with the inner radial protrusions where appropriate, is made in the casing. The protrusions are derived from molding. This leads to good cost-effectiveness.

According to an alternative aspect, the inner bearing, with where appropriate the inner radial protrusions, can be made in the metal cover. This makes the inner bearing very durable.

According to another aspect, the friction ring comprises a neck whose inner shape is generally complementary to a toothing of the output pinion. This allows for robust rotation of the friction ring, preferably without clearance.

According to another aspect, the neck serves to center the output member on the axis by mating with an axial bore (18) of the cover. This provides for the centering of the output member on the axis A1 defined by the bore of the cover.

According to another aspect, the neck comprises inner recesses for receiving the teeth of the pinion and, on the radially outer side, a cylindrical bearing surface received in the axial bore of the cover. The neck is of an ad-hoc shape for rotational driving and geometric centering on the axis.

In another aspect, the friction ring comprises a perforated plate. This facilitates the deformation and the oval-reshaping of the skirt.

According to another aspect, the braking torque induced by the contact is at least equal to 3 N·m. The perception limit of the clearance of the reduction gear is pushed back in the event of a change in loading polarity.

According to another aspect, the reduction gear is of the hypocycloid type with an Oldham coupling. This type of gearbox is compact and provides a significant reduction rate.

According to another aspect, the inner radial protrusions circumscribing a first pitch circle C1, and the skirt at rest is circumscribed in a second pitch circle C2, the diameter of C2 being greater than the diameter of C1. The assembly induces a prestress which results in the skirt taking on an oval shape, and the contact against the inner bearing gives the desired effect of the friction brake.

According to another embodiment, the skirt comprises a succession of segments substantially forming ropes, the adjacent segments two by two being connected together by bent junctions. In other words, in this case, in cross-section transverse to the axis, the skirt generally has a polygonal shape.

According to another embodiment, the skirt comprises waves or corrugations, which at rest have a radial dimension greater than a radial gap (E1) between the peripheral rim and the inner bearing, the waves or corrugations being compressed in the radial direction once the skirt is inserted between the peripheral rim and the inner bearing. This provides contact with radial prestress having the desired friction braking effect.

The present disclosure also relates to a vehicle seat comprising one or more motorized drive devices as described above.

Motorized drive device for a vehicle seat having a squab in particular with raising, the device comprising an actuator (13) and an actuator housing (10) containing a reduction gear (8), an output member (3), mounted to rotate about an axis (A1), the output member comprising a peripheral rim (2), a friction ring (4) mounted around the output member and rotationally integral with the output member, the friction ring comprising a skirt (5), the actuator housing comprising an inner bearing (1) optionally provided with a plurality of inner radial protrusions (1a) for receiving the skirt, the skirt coming into contact at least against the inner bearing in order to generate a continuous friction between the output member forming a rotating part and the inner bearing forming a fixed part.

The invention claimed is:

1. A motorized drive device for a vehicle seat having a squab frame, the drive device being configured to drive a movement of a movable element connected to the squab frame, the device comprising:
   an actuator and an actuator housing containing at least one reduction gear,
   an output member, mounted to rotate about an axis, the output member comprising a peripheral rim,
   a friction ring mounted around the output member and rotationally integral with the output member, the friction ring comprising a skirt,
   the actuator housing comprising an inner bearing for receiving the skirt,
   the skirt being in contact with at least the inner bearing in order to form a friction brake between the output member forming a rotating part and the inner bearing forming a fixed part.

2. The motorized drive device of claim 1, wherein the skirt generally has rotational symmetry at rest, and is oval-shaped under stress once assembled inside the inner bearing.

3. The motorized drive device of claim 1, wherein the inner bearing is provided with a plurality of inner radial protrusions protruding radially inwards, the inner radial protrusions being made in the metal cover.

4. The motorized drive device of claim 1, wherein the skirt has an outer diameter at rest of at least 40 millimeters.

5. The motorized drive device of claim 1, wherein the friction ring is formed as a single molded part made of resilient plastic material.

6. The motorized drive device of claim 1, wherein the skirt has an outer diameter at rest of at least 35 mm.

7. The motorized drive device of claim 1, wherein the skirt also bears, on a radially inner side, on the peripheral rim of the output member.

8. The motorized drive device of claim 7, wherein notches/ribs directed inwards to contact the rim are provided.

9. The motorized drive device of claim 1, wherein the actuator housing comprises a casing made of plastic or of light alloy and a metal cover, and the inner bearing is made in the casing.

10. The motorized drive device of claim 1, wherein the actuator housing comprises a casing made of plastic or of light alloy and a metal cover, and the inner bearing is made in the metal cover.

11. The motorized drive device of claim 1, wherein the friction ring comprises a neck of inner shape generally complementary to a toothing of an output pinion.

12. The motorized drive device of claim 1, wherein the friction ring comprises a perforated plate.

13. The motorized drive device of claim 1, wherein the reduction gear is of a hypocycloid type with an Oldham coupling.

14. The motorized drive device of claim 1, wherein the inner bearing is provided with a plurality of inner radial protrusions protruding radially inwards, the inner radial protrusions being made in the casing.

15. The motorized drive device of claim 1, wherein the skirt comprises a succession of segments substantially forming ropes, the adjacent segments two by two being connected together by bent junctions, the vertex of the bent junctions being in contact with the inner bearing.

16. The motorized drive device of claim 1, wherein the skirt comprises waves or corrugations, which at rest have a radial dimension greater than a radial interval available between the peripheral rim and the inner bearing, the waves or corrugations being compressed in the radial direction once the skirt is inserted between the peripheral rim and the inner bearing.

17. A seat for a motor vehicle comprising the motorized drive device according to claim 1.

18. The motorized drive device of claim 1, wherein the inner bearing is provided with a plurality of inner radial protrusions protruding radially inwards.

19. The motorized drive device of claim 18, wherein a first group of inner radial protrusions and a second group of inner radial protrusions are provided, the two groups being diametrically opposed.

20. The motorized drive device of claim 18, wherein the inner radial protrusions circumscribing a first pitch circle, and the skirt at rest is circumscribed in a second pitch circle, the diameter of the second pitch circle being greater than the diameter of the first pitch circle.

* * * * *